July 11, 1967
J. D. ALLEN
3,330,298
CUSHION VALVE ARRANGEMENT
Filed Aug. 5, 1965
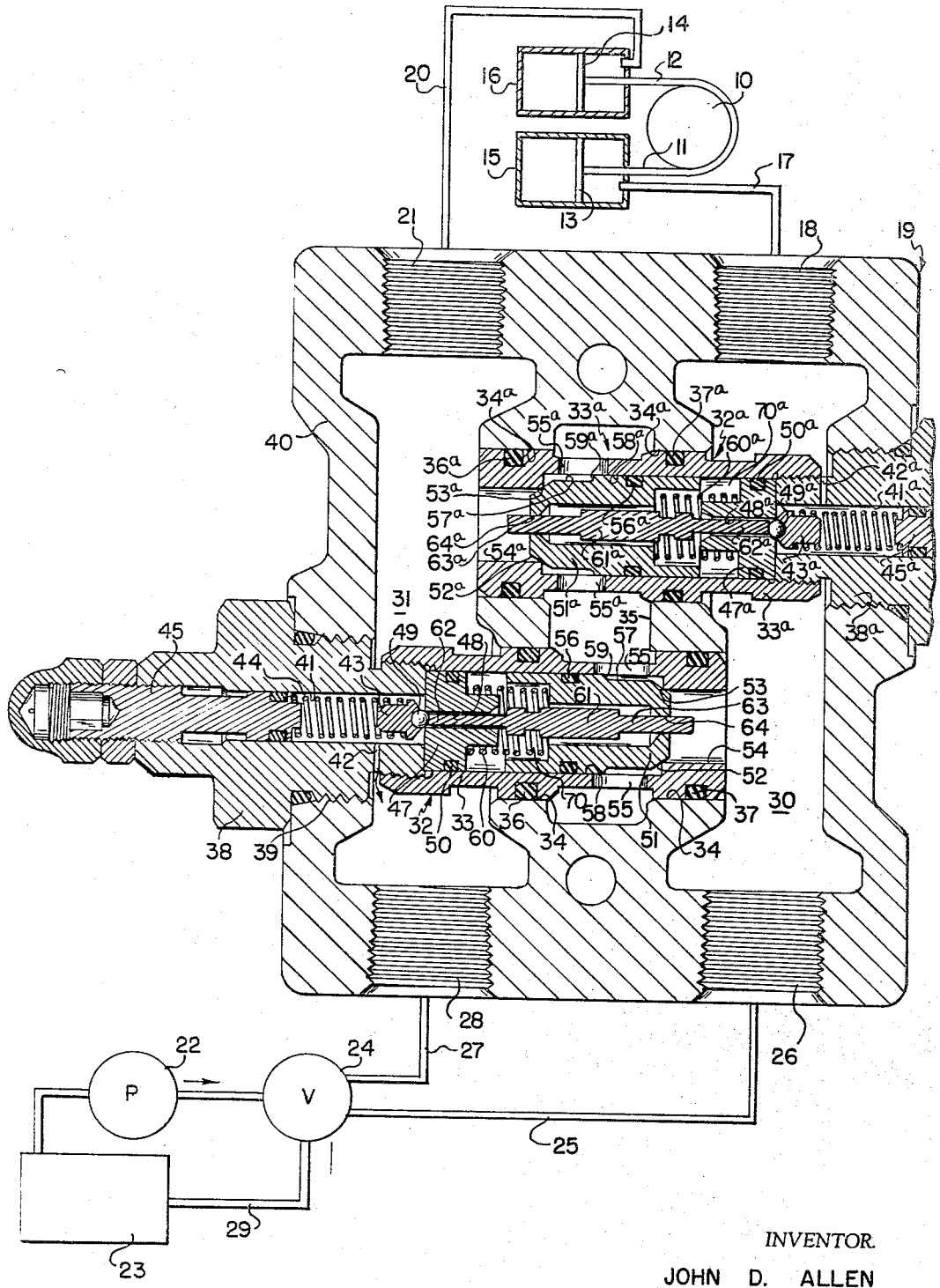
INVENTOR.
JOHN D. ALLEN
BY
Ely, Golrick & Flynn
ATTORNEYS ized July 11, 1967

3,330,298
CUSHION VALVE ARRANGEMENT
John D. Allen, South Euclid, Ohio, assignor to Fawick Corporation, a corporation of Michigan
Filed Aug. 5, 1965, Ser. No. 477,376
6 Claims. (Cl. 137—491)

ABSTRACT OF THE DISCLOSURE

A cushion valve arrangement for relieving a fluid pressure surge comprises a normally-closed, pilot-operated relief valve having an inlet connected to a first passage, an outlet connected to a second passage through a normally-closed backflow-preventing valve, and a differential area piston controlling the flow between the inlet and the outlet. The piston is unseated by the opening of a pilot valve which is vented directly to the second passage to provide a substantially flat pressure-flow characteristic. The backflow-preventing valve preferably is an identical, but oppositely acting, pilot-operated relief valve which relieves pressure surges occurring in the second passage via the first relief valve back to the first passage, so that each relief valve acts as a backflow-preventing valve for the other.

---

This invention relates to a cushion valve arrangement for relieving high pressure surges in a hydraulic system.

Cushion valves commonly are used in hydraulic systems where a piston-and-cylinder or other hydraulic motor moving a heavy load may be stopped suddenly, thus developing an excessive pressure surge in the system. For most such systems two relief valves must be provided, one for each motor port, to relieve the pressure surge from the line at that side of the motor to the line at the opposite side. Backhoe swing systems and hydraulic winch systems are typical examples of systems which require such a dual cushion valve arrangement.

The present invention is directed to a cushion valve arrangement of the type having a pilot-operated relief valve with a differential area main piston which, as is known, has good tolerance to dirt and other foreign particles in the hydraulic liquid. This relief valve is arranged to open in response to a pressure surge in the line connected to one side of the hydraulic motor, bypassing this surge to the line connected to the opposite side of the hydraulic motor. A backflow-preventing valve normally must be provided between this relief valve and the opposite line to insure that normal fluid pressure in the opposite line cannot open the relief valve, which otherwise might happen because of the differential area construction of its main piston. The conventional practice heretofore has been to vent the pilot of such a relief valve to the outlet side of the valve, ahead of the backflow-preventing valve. Under such circumstances, the pressure drop across the backflow-preventing valve is added to the pressure at the inlet of the relief valve, and this produces a rising pressure characteristic with increased flow rates, which tends to defeat the fundamental purpose of the cushion valve.

The present invention overcomes this difficulty by the provision in such a relief valve of a novel pilot venting arrangement connected directly to the opposite line, by-passing the backflow-preventing valve. Due to this novel pilot venting arrangement, the cushion valve has a substantially flat pressure-flow characteristic, with the pressure drop across the cushion valve remaining substantially constant over a wide range of flow rates. Preferably, the present invention has two such cushion valves connected across the hydraulic lines, with each cushion valve serving as the relief valve for its particular line and as the backflow-preventing valve for the other relief valve.

Accordingly, it is the principal object of this invention to provide a novel and improved cushion valve arrangement for a hydraulic system.

Another object of this invention is to provide such a cushion valve arrangement having a substantially flat pressure-flow characteristic.

Another object of this invention is to provide such a cushion valve arrangement having a pilot-operated relief valve with a differential area main piston and a backflow-preventing valve at the outlet side of the relief valve, the relief valve having a novel pilot venting arrangement by-passing the backflow-preventing valve so as to provide a substantially flat pressure-flow characteristic.

Another object of this invention is to provide a novel and improved dual cushion valve arrangement having two oppositely-acting relief valves for relieving pressure surges in respective lines and each serving as a back-flow-preventing valve for the other.

Further objects and advantages of this invention will be apparent from the following detailed description of a presently-preferred embodiment thereof which is shown in the single figure of the accompanying drawing, in which the cushion valve arrangement itself is shown in enlarged cross-section and the remainder of the hydraulic system is shown schematically on a smaller scale.

Referring to the drawing, the system shown schematically therein comprises a pulley 10 coupled to the pivot post (not shown) of a backhoe. The pulley is operated by flexible cables 11 and 12, which are coupled respectively to pistons 13 and 14 operating in cylinders 15 and 16. A fluid line 17 leading to cylinder 15 is connected to a port 18 of the present valve, designated in its entirety by the reference numeral 19. A fluid line 20 leading to cylinder 16 is connected to another port 21 of valve 19.

The system also includes a pump 22 for delivering hydraulic fluid from a sump 23 through a manually operable fourway selector valve 24 either to a line 25 leading to a port 26 of valve 19 or to a line 27 leading to a port 28 of valve 19. A return line 29 extends from the selector valve 24 to the sump 23. Valve 19 has a first fluid passage 30 interconnecting its ports 18 and 26, and a second fluid passage 31 interconnecting its ports 21 and 28.

In the normal operation of this system, in order to turn the pulley counterclockwise in the figure, the selector valve 24 is operated to connect the output of pump 22 to line 27. Fluid under pressure flows through the cushion valve 19 from port 28 through passage 31 to port 21, and thence through line 20 to cylinder 16. The resulting pull on cable 12 turns the pulley 10 counterclockwise and also exerts a pull on cable 11 to move piston 13 to the right. Fluid from cylinder 15 returns through line 17 to port 18 of valve 19 and thence through passage 30 to port 26 and from there through line 25, selector valve 24 and line 29 to the sump 23.

When it is desired to turn the pulley 10 clockwise the selector valve 24 is operated to connect the output of pump 22 to line 25 and to connect line 27 to the sump return line 29, so that the fluid flow takes place in the reverse direction from that just described.

In accordance with the presently-preferred embodiment of this invention, the cushion valve 19 has a pair of identical pilot-operated, differential area main piston relief valves, 32 and 32a, respectively, connected between the passages 30 and 31 and respectively mounted in reverse fashion with respect to one another. Relief valve 32 relieves high pressure surges in passage 30 and prevents normal fluid pressures in passage 30 from opening relief valve 32a. Relief valve 32a relieves high pressure surges in passage 31 and prevents normal fluid pressures in passage 31 from opening relief valve 32.

Relief valve 32 comprises a generally sleeve-like cartridge body member 33, which is received in a first transverse bore 34 in the body of valve 19 extending between passages 30 and 31. Relief valve 32a comprises an identical second cartridge body member 33a, which is similarly received in a second transverse bore 34a in the body of valve 19 extending between passages 30 and 31. An intermediate passage 35 in this valve body interconnects the transverse bores 34 and 34a. The first cartridge body member 33 carries a pair of O-rings 36, 37 which sealingly engage bore 34 on opposite sides of the intermediate passage 35. The second cartridge body member 33a also carries O-rings 36a, 37a which similarly sealingly engage bore 34a on opposite sides of passage 35.

At its left end in the drawing, the first cartridge body member 33 is threadedly connected to the inner end of a mounting body 38, which is threadedly mounted at 39 in the left end wall of the valve body.

The mounting body 38 has an axial bore 41 extending from its inner end and a radial passage 42 located just beyond the left end of the cartridge body member 33 and extending between bore 41 and the second passage 31 in the body of valve 19. A pilot valve member 43 is loosely received in the axial bore 41 and is biased to the right therein by a coil spring 44, which is engaged under compression between this pilot valve member and an adjusting screw 45. The adjusting screw is threadedly mounted in the outer end of the cartridge mounting body 38 to enable the selective adjustment of the bias force which spring 44 exerts on pilot valve member 43.

The cartridge body member 33 carries an end plate member 47 which abuts against the inner end of the mounting body 38. Body member 33 and end plate member 47 together constitute the body of the first pilot-operated relief valve 32. This end plate member 47 has an axial passage 48 which opens into the bore 41 in mounting body 38. The pilot valve member 43 carries a valve ball 49 which normally sealingly engages the end plate member 47 at this passage. Due to passage 42, the bore 41 at the back side of pilot valve 43, 49 is at substantially the fluid pressure of passage 31 in the body of valve 19. That is, the pilot valve is vented directly to passage 31. The end plate member 47 carries an O-ring 50 sealingly engaging the inside of cartridge body member 33.

The cartridge body member 33 slidably receives a main valve member in the form of a differential area piston 51. At its right end in the drawing this valve member 51 has a frusto-conical front end nose 52 which normally seats against a circular inside corner 53 on the cartridge body member 33. This corner is at the inner (left) end of an axial port 54 in cartridge body member 33 which at its opposite (right) end is open to the passage 30 in the body of valve 19.

The cartridge body member 33 has radial openings 55 which communicate with the intermediate passage 35 in the body of valve 19. Valve member 51 carries an O-ring 56 which sealingly engages the inside of the cartridge body member 33 to the left of these openings. Just behind its front end nose 52 the valve member 51 has a cylindrical portion 57 which is smaller in diameter than the bore 58 of the cartridge body member 33, so that there is an annular space within this bore surrounding this portion 57 of valve member 51 and communicating with the radial openings 55 in cartridge body member 33. Just behind this reduced cylindrical portion 57, the valve member 51 presents a tapered annular face 59 and behind this face it has a close, sliding fit with the inside of cartridge body 33. A coil spring 60 is engaged under compression between the end plate member 47 and the valve member 51 and it normally positions the latter's front end nose 52 in sealing engagement with the main valve seat 53 on the cartridge body member 33.

The front end of valve member 51 presents a relatively small, forwardly-facing first area, bounded by valve seat 53, which is exposed to the fluid pressure at port 54. Valve member 51 also presents a much larger, rearwardly-facing second area which is exposed to the fluid pressure in a pressure chamber 70 within the body 33, 47 of this relief valve.

A pin 61 is reciprocably mounted in valve member 51. The rear end portion 62 of this pin has a very loose clearance in the passage 48 in the end plate member 47. The front end portion 63 of this pin has a close sliding fit in an axial opening 64 in the front end of valve member 51 and it projects into the passage 54 in the front end of the cartridge body member 33 so as to be exposed at all times to the fluid pressure in passage 30 in the body of valve 19. As already stated, the back side of pliot valve 43, 49 is vented directly to passage 31. Therefore, the pressure differential across pin 61 and pilot valve 43, 49 is the pressure differential between passages 30 and 31.

The second relief valve 32a is identical in construction, but reversed end-to-end, to the just-described first relief valve, with corresponding parts having the same reference numerals plus an *a* subscript.

Operation

Normally, the main valve member 51 of the first relief valve 32 is maintained seated against its valve seat 53. This is because the fluid pressure in valve body passage 30 acting against its front end beyond its valve seat 53, and tending to unseat it, is overcome by the combined forces of spring 60 and the same fluid pressure in chamber 70 acting against the much larger rearwardly-facing area of valve member 51. Due to leakage of fluid along opening 64 past the front end portion 63 of pin 61, the fluid pressure in chamber 70 will be substantially the same as the pressure in the first valve body passage 30, normally. Thus, valve member 51 is a differential area piston having only a small fraction of its cross-section exposed to the fluid pressure in passage 30 tending to open it and a much larger cross-sectional area exposed to the same fluid pressure at the back. Due to this differential area arrangement the spring 60 may be much smaller, for a given valve seat size, than would be the case for a balanced area piston. Because of the differential area construction of relief valve 32, a backflow-preventing valve must be provided between it and passage 31 so that normal fluid pressures in passage 31 will not open valve 32. The second relief valve 32a serves this purpose.

The ball 49 on pilot valve member 43 normally will be seated against its valve seat. The fluid pressure behind pilot valve member 43 will be that of the second valve body passage 31. The net forces acting on pilot valve 43, 49 and pin 61 are due to the fluid pressure differential between passages 30 and 31 in the body of valve 19 and the biasing force of spring 44.

A high pressure surge in passage 30 will overcome the spring and fluid pressure forces tending to hold the pilot valve 43, 49 seated and pin 61 will move to the left to unseat the pilot valve. When this happens, the fluid pressure in chamber 70 is relieved by way of the passage 48 in the back end plate member 47 and the radial passage 42 in the mounting body 38 to the second passage 31 in the body of valve 19.

Due to this pressure reduction at the back end of valve member 51, the higher fluid pressure acting against the smaller exposed area on the front end of valve member 51 will be effective to move valve member 51 to the left, unseating it to rapidly unload the fluid pressure from passage 30 into the intermediate passage 35. The main valve member 51a of the second relief valve 32a at this time opens in response to this increased pressure in passage 35 to unload the fluid pressure to the return passage 31 in the body of valve 19. This condition will prevail until the pressure in passage 30 has dropped to a safe value. During this time, the fluid pressure acting against the back end of valve member 51 will stay reduced because of the flow restriction provided by the slight clearance between the front end portion 63 of pin 61 and the opening 64 in the front end of valve member 51, which flow restriction creates a fluid pressure differential between passage 30 and the pressure chamber 70 behind the valve member 51.

A very significant advantage of the present invention is that the pilot valve 43, 49 is vented *directly* to the opposite passage 31 from the passage 30 where the fluid pressure surge occurs. Accordingly, the pressure differential acting on pin 61 and pilot valve 43, 49 is the pressure differential between passages 30 and 31. The conventional practice heretofore has been to vent the pilot valve to the same passage as the main relief valve, ahead of the backflow-preventing valve in that passage. In the present case, such a conventional pilot venting arrangement would be to the intermediate passage 35, so that once the pilot valve opened the fluid pressure differential acting on pin 61 and pilot valve 43, 49 would be the pressure differential between passages 30 and 35. However, due to the pressure drop across the back-flow-preventing valve (in this case, the second main relief valve member 51a and its seat), the combined valve assembly would have a rising pressure characteristic with increased flow rates. In contrast, in the present invention a substantially flat pressure-flow characteristic is achieved by virtue of the novel pilot venting arrangement.

It will be obvious that the second relief valve 32a operates in the same fashion to relieve high pressure surges in passage 31. Relief valve 32 acts as a backflow-preventing valve at the outlet side of relief valve 32a to prevent normal fluid pressures in passage 30 from opening valve 32a, and itself opening in response to the opening of relief valve 32a for relieving pressure surges in passage 31 to passage 30.

While a presently-preferred embodiment of this invention has been described in detail and illustrated in the accompanying drawing, it is to be understood that the invention is susceptible of other embodiments and that various modifications, omissions and refinements which depart from the disclosed embodiment may be adopted without departing from the spirit and scope of this invention.

I claim:

1. A cushion valve arrangement for relieving a high pressure surge in a first fluid passage to a second fluid passage comprising:
   a normally-closed, pilot-operated relief valve with a differential area main piston and having an inlet connected to said first fluid passage and having an outlet;
   a normally-closed back-flow-preventing valve connected between the outlet of said relief valve and said second passage and adapted to open in response to fluid pressure at said outlet;
   and means venting the pilot of said relief valve directly to said second passage and bypassing said backflow-preventing valve.

2. A cushion valve arrangement for relieving a high pressure surge in a first fluid passage to a second fluid passage comprising:
   a normally-closed, pilot-operated relief valve including means defining an inlet port connected to said first passage and outlet port means spaced from said inlet port, a main valve seat between said inlet port and said outlet port means, a main valve member engaging said main valve seat and presenting a forwardly-facing first area thereat exposed to the fluid pressure at said inlet port, said main valve member presenting a substantially larger rearwardly-facing second area, means for normally maintaining a fluid pressure acting against said second area which is substantially equal to the pressure at said inlet port to urge said main valve member against said main valve seat, spring means urging said main valve member against said main valve seat;
   a normally-closed backflow-preventing valve connected between said outlet port means of said relief valve and said second passage to prevent the opening of said relief valve by normal fluid pressure in said second passage, said backflow-preventing valve opening in response to pressure at said outlet port means of the relief valve;
   and a normally-closed pilot valve connected directly between said rearwardly-facing second area of said main valve member and the second passage, and means exposed to the pressure at said first passage for opening said pilot valve in response to a high pressure surge in said first passage so as to relieve the fluid pressure acting against said rearwardly-facing second area of said main valve member to said second passage.

3. A cushion valve arrangement for relieving a high pressure surge in a first fluid passage to a second fluid passage comprising:
   a normally-closed, pilot-operated relief valve including a body defining an inlet port connected to said first passage and outlet port means spaced from said inlet port, a main valve seat between said inlet port and said outlet port means, a hollow main valve member slidable in said body and engaging said main valve seat and presenting a forward end exposed to the fluid pressure at said inlet port, said main valve member presenting a rearwardly-facing area substantially larger than the area of said forward end exposed to the pressure at said inlet port, said body defining a pressure chamber behind said rearwardly-facing area of said main valve member, said main valve member having an opening extending between its forward end and said pressure chamber, a pin having a close sliding fit in said opening with a sufficient clearance therein to normally establish in said pressure chamber a fluid pressure substantially equal to the pressure at said inlet port to urge said main valve member against said main valve seat, spring means urging said main valve member against said main valve seat, said body having an opening extending rearwardly from said pressure chamber, said pin extending into said body opening and having a loose clearance therein;
   a normally-closed backflow-preventing valve connected between said outlet port means of said relief valve and said second passage to prevent the opening of said relief valve by normal fluid pressure in said second passage, said backflow-preventing valve opening in response to fluid pressure at said outlet port means of the relief valve;
   and a normally-closed pilot valve for said relief valve comprising a valve seat at the end of said body opening away from said pressure chamber and a pilot valve member seated against said last-mentioned valve seat, and passage means at the opposite side of said pilot valve member from its valve seat connected directly to said second fluid passage, whereby the unseating of said pilot valve member by movement of the pin in response to a pressure surge at the inlet port of the relief valve relieves said pressure chamber to said second fluid passage.

4. A dual cushion valve arrangement for relieving a pressure surge in either of a first and a second fluid passage in a hydraulic system comprising:
   a first normally-closed, pilot-operated relief valve with a differential area piston and having an inlet connected to said first passage and an outlet;

a second normally-closed, pilot-operated relief valve with a differential area piston and having an inlet connected to said second passage and an outlet connected to the outlet of said first relief valve, whereby each relief valve serves as a backflow-preventing valve for the other;

means venting the pilot of said first relief valve directly to said second passage and bypassing said second relief valve;

and means venting the pilot of said second relief valve directly to said first passage and bypassing said first relief valve.

5. A dual cushion valve arrangement for relieving pressure surges in either of a first and a second passage in a hydraulic system comprising:

a first normally-closed, pilot operated relief valve including means defining an inlet port connected to said first passage and outlet port means spaced from said inlet port, a main valve seat between said inlet port and said outlet port means, a main valve member engaging said main valve seat and presenting a forwardly-facing first area thereat exposed to the fluid pressure at said inlet port, said main valve member presenting a substantially larger rearwardly-facing second area, means for normally maintaining a fluid pressure acting against said second area which is substantially equal to the pressure at said inlet port to urge said main valve member against said main valve seat, spring means urging said main valve member against said main valve seat;

a second normally-closed, pilot-operated relief valve including means defining an inlet port connected to said second passage and outlet port means spaced from said last-mentioned inlet port, a valve seat between said last-mentioned inlet port and outlet port means, a main valve member engaging said last-mentioned main valve seat and presenting a forwardly-facing first area thereat exposed to the fluid pressure at said last-mentioned inlet port, said last-mentioned main valve member presenting a substantially larger rearwardly-facing second area, means for normally maintaining a fluid pressure acting against said last-mentioned second area which is substantially equal to the pressure at said last-mentioned inlet port to urge said last-mentioned main valve member against its valve seat, spring means urging said last-mentioned main valve member against its valve seat;

means defining an intermediate passage directly connecting said outlet port means of the first relief valve to said outlet port means of the second relief valve, whereby each relief valve serves as a backflow-preventing valve for the other;

a normally-closed first pilot valve connected directly between said rearwardly-facing second area of the main valve member in the first relief valve and the second passage, and means exposed to the pressure at said inlet port of the first relief valve for opening said pilot valve in response to a high pressure surge at said inlet port so as to relieve the fluid pressure acting against said rearwardly-facing second area of the main valve member in the first relief valve to the second passage;

and a normally-closed second pilot valve connected directly between said rearwardly-facing second area of the main valve member in the second relief valve and the first passage, and means exposed to the pressure at said inlet port of the second relief valve for opening said second pilot valve in response to a high pressure surge at said last-mentioned inlet port so as to relieve the fluid pressure acting against said rearwardly-facing second area of the main valve member in the second relief valve to the first passage.

6. A dual cushion valve arrangement for relieving a pressure surge in either of a first and a second fluid passage in a hydraulic system comprising:

a first normally-closed, pilot-operated relief valve including a body defining an inlet port connected to said first passage and outlet port means spaced from said inlet port, a main valve seat between said inlet port and said outlet port means, a hollow main valve member slidable in said body and engaging said main valve seat and presenting a forward end exposed to the fluid pressure at said inlet port, said main valve member presenting a rearwardly-facing area substantially larger than the area of said forward end exposed to the pressure at said inlet port, said body defining a pressure chamber behind said rearwardly-facing area of said main valve member, said main valve member having an opening extending from its forward end to said pressure chamber, a pin having a close sliding fit in said opening with a sufficient clearance therein to normally establish in said pressure chamber a fluid pressure substantially equal to the pressure at said inlet port to urge said main valve member against said main valve seat, spring means urging said main valve member against said main valve seat, said body having an opening extending rearwardly from said pressure chamber, said pin extending into said body opening and having a loose clearance therein;

a second normally-closed, pilot-operated relief valve including a body defining an inlet port connected to said second passage and outlet port means spaced from said last-mentioned inlet port, a main valve seat between said inlet port and said outlet port means, a hollow main valve member slidable in said last-mentioned body and engaging said last-mentioned main valve seat and presenting a forward-end exposed to the fluid pressure at said last-mentioned inlet port, said last-mentioned main valve member presenting a rearwardly-facing area substantially larger than the area of said forward end exposed to the pressure at said last-mentioned inlet port, said last-mentioned body defining a pressure chamber behind said rearwardly-facing area of said last-mentioned main valve member, said last-mentioned main valve member having an opening extending from its forward end to said last-mentioned pressure chamber, a pin having a close sliding fit in said last-mentioned opening with a sufficient clearance therein to normally establish in said last-mentioned pressure chamber a fluid pressure substantially equal to the pressure at said last-mentioned inlet port to urge said last-mentioned main valve member against its valve seat, spring means urging said last-mentioned main valve member against its valve seat, said last-mentioned body having an opening extending rearwardly from said last-mentioned pressure chamber, said pin extending into said last-mentioned body opening and having a loose clearance therein;

means defining an intermediate passage directly connecting said outlet port means of the first relief valve to said outlet port means of the second relief valve;

a normally-closed first pilot valve for said first relief valve comprising a valve seat at the end of the latter's body opening away from said pressure chamber therein and a pilot valve member seated against said last-mentioned valve seat, and passage means at the opposite side of said pilot valve member from its valve seat connected directly to said second fluid passage, whereby the unseating of said pilot valve member by movement of said pin in the first relief valve in response to a pressure surge at the latter's inlet port relieves said pressure chamber in the first relief valve to said second fluid passage;

and a normally-closed second pilot valve for said second relief valve comprising a valve seat at the end of the latter's body opening away from said pressure chamber therein and a pilot valve member seated against said last-mentioned valve seat, and passage means at the opposite side of said last-mentioned pilot valve member from its valve seat connected directly to said first fluid passage, whereby the unseating of said second pilot valve member by movement of the pin in the second relief valve in response to a pressure surge at the latter's inlet port relieves said pressure chamber in the second relief valve to said first fluid passage.

References Cited

UNITED STATES PATENTS

| 3,129,720 | 4/1964 | Allen et al. | 137—490 |
| 3,207,177 | 9/1965 | Nevulis | 137—596.12 X |
| 3,267,961 | 8/1966 | Rice | 137—596 |

M. CARY NELSON, *Primary Examiner.*

M. O. STURM, *Assistant Examiner.*